United States Patent
Kawasaki et al.

(10) Patent No.: US 7,963,157 B2
(45) Date of Patent: Jun. 21, 2011

(54) APPARATUS AND METHOD FOR DETECTING DECREASE IN TIRE AIR PRESSURE AND PROGRAM FOR DETECTING DECREASE IN TIRE AIR PRESSURE

(75) Inventors: Hiroaki Kawasaki, Ashiya (JP); Shuichi Adachi, Kuki (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 253 days.

(21) Appl. No.: 12/466,551

(22) Filed: May 15, 2009

(65) Prior Publication Data
US 2009/0282906 A1 Nov. 19, 2009

(30) Foreign Application Priority Data
May 16, 2008 (JP) .................................. 2008-129055

(51) Int. Cl.
*G01M 17/02* (2006.01)
*G01L 7/00* (2006.01)
(52) U.S. Cl. ........................... 73/146; 340/442; 702/138
(58) Field of Classification Search .................. None
See application file for complete search history.

(56) References Cited

U.S. PATENT DOCUMENTS

| | | | | |
|---|---|---|---|---|
| 5,301,130 | A * | 4/1994 | Alcone et al. ................. | 702/141 |
| 5,557,552 | A * | 9/1996 | Naito et al. ................... | 702/148 |
| 6,264,292 | B1 * | 7/2001 | Umeno et al. ................ | 303/196 |
| 6,584,427 | B2 * | 6/2003 | Kamiya et al. ............... | 702/140 |
| 6,789,038 | B2 * | 9/2004 | Nakashima et al. .......... | 702/142 |
| 7,676,345 | B2 * | 3/2010 | Gustavsson et al. .......... | 702/142 |
| 2002/0095264 | A1 * | 7/2002 | Kamiya et al. ................ | 702/50 |
| 2003/0200051 | A1 | 10/2003 | Nakashima et al. | |
| 2006/0015288 | A1 * | 1/2006 | Ai et al. ........................ | 702/142 |

FOREIGN PATENT DOCUMENTS

| | | |
|---|---|---|
| DE | 10349625 A1 | 7/2004 |
| EP | 578826 A1 | 1/1994 |
| EP | 1350642 A2 | 10/2003 |
| EP | 1674303 A2 | 6/2006 |
| JP | 3152151 B2 | 1/2001 |
| JP | 2005-14664 A | 1/2005 |

* cited by examiner

*Primary Examiner* — Lisa M Caputo
*Assistant Examiner* — Jermaine Jenkins
(74) *Attorney, Agent, or Firm* — Birch, Stewart, Kolasch & Birch, LLP

(57) ABSTRACT

An apparatus for detecting a decrease in a tire air pressure includes: a rotation velocity information detection means for periodically detecting tire rotation velocity information for the respective wheels of a vehicle; a frequency characteristic estimate means for estimating, based on this rotation velocity information, a frequency characteristic of the rotation velocity information; and a judgment means for judging, based on the estimated frequency characteristic, a decrease in the air pressure of the tire. The frequency characteristic estimate means includes, with regard to a time-series signal including the rotation velocity information, a parameter estimate means for subjecting parameters of a three-order or more linear model to a time-series estimate; an input signal estimate means for estimating, based on the estimated linear model and the rotation velocity information that is an output signal of the linear model, an input signal to the linear model; a parameter identification means for identifying, based on the estimated input signal and the rotation velocity information, parameters of a linear model caused to have a lower order of a second order; and a resonant frequency estimate means for estimating, based on the parameters identified based on the model caused to have a lower order of the second order, a resonant frequency of the tire in a torsional direction.

14 Claims, 11 Drawing Sheets

APPARATUS AND METHOD FOR DETECTING DECREASE IN TIRE AIR PRESSURE AND PROGRAM FOR DETECTING DECREASE IN TIRE AIR PRESSURE

BACKGROUND OF THE INVENTION

1. Field of the Invention

The present invention relates to an apparatus and a method for detecting a decrease in a tire air pressure and a program for detecting a decrease in a tire air pressure. More particularly, the present invention relates to an apparatus and a method for detecting a decrease in a tire air pressure and a program for detecting a decrease in a tire air pressure by which a decrease in a tire air pressure is detected based on a resonant frequency of the tire of a running vehicle.

2. Description of the Related Art

Various methods or apparatuses for detecting a decrease in an air pressure of a tire attached to a vehicle have been known. Among the methods and apparatuses, an advantageous method from the viewpoint of cost has been suggested by which a decrease in an air pressure of individual tires can be detected. This method is a tire frequency method that focuses attention on a point that a tire vibration characteristic during a vehicle's running changes while depending on an internal pressure of the tire.

In the tire frequency method as described above, a resonant frequency of a rotation signal of a wheel is estimated. This resonant frequency can be accurately estimated by subjecting a time-series signal including a tire vibration component to a frequency analysis.

However, the frequency analysis requires a memory having an extremely-large capacity for performing a process such as the Fourier transform, causing a high cost of an in-vehicle computer. Thus, this method is not realistic.

To solve this, various methods have been suggested for estimating the resonant frequency with predetermined accuracy without using a process such as the Fourier transform. For example, the specification of Japanese Patent No. 3152151 discloses a method to introduce the second-order linear prediction model with regard to a time-series signal including a tire vibration component (wheel speed signal), and to identify parameters of the linear prediction model to compute a resonant frequency of the tire. This method further extracts the influence quantity of an external factor having an influence on the calculated resonant frequency to correct, in accordance with this influence quantity of the external factor, the resonant frequency or a tire air pressure estimated based on this influence quantity. The specification of Japanese Patent No. 3152151 also enumerates, as external factors having an influence on the resonant frequency, three factors, namely an outside air temperature, a vehicle velocity, and a magnitude of the vibration given to a tire from a road surface. This method suggests that the correction is performed based on any two or all of these three external factors.

Japanese Unexamined Patent Publication No. 2005-14664 discloses a method by which, when a resonant frequency as a tire air pressure evaluation value is calculated, the resonant frequency is stored while being linked with a wheel speed, the outside air temperature, and the road type at which the resonant frequency was calculated. This method estimates a decrease in a tire air pressure based on a relation between a resonant frequency calculated under a certain condition and a resonant frequency (reference value) calculated under the same condition as the above condition.

The resonant frequency of a tire in the torsional direction is generally known to be influenced by the outside air temperature. However, the vehicle velocity and the magnitude of the vibration given to a tire from a road surface have substantially little influence on the resonant frequency and this influence is sufficiently smaller than the influence by a change in the tire air pressure. The reason is that the resonant frequency of a tire in the torsional direction is a tire-specific vibration mode and is caused due to the torsional rigidity of the tire, and thus the resonant frequency does not change depending on a vehicle velocity or a manner of excitation due to a different road. FIGS. 10 to 11 illustrate an example of a frequency characteristic of a tire rotation signal calculated by the fast Fourier transform. FIG. 10 illustrates a tire frequency characteristic when a vehicle is caused to run with three types of velocities. FIG. 11 illustrates a tire frequency characteristic when a vehicle is caused to run on two types of roads. As can be seen from FIGS. 10 to 11, a change in the vehicle velocity or the road has substantially no influence on the value itself of the tire resonant frequency existing in the vicinity of 40 Hz.

However, on the other hand, the vehicle velocity and the magnitude of the vibration given to a tire from a road surface are known to have a significant influence on frequency characteristics other than a resonant frequency in the torsional direction included in a wheel rotation signal. For example, a higher vehicle velocity causes a higher vibration of a tire in the longitudinal direction, and the frequency characteristic at a further higher frequency-side than the frequency in the torsional direction changes significantly. Furthermore, higher vibration given from a road surface causes higher excitation of a tire and thus the gain of the entire frequency characteristic is increased and the vibration of the tire in the longitudinal direction at a high speed also significantly increases. Specifically, the vehicle velocity and the level of the vibration given to the tire from the road surface have no influence on the resonant frequency of a tire in the torsional direction but have a very high influence on the entire frequency characteristic.

On the other hand, when a wheel rotation signal is used as a time-series signal and a resonant frequency is estimated based on a linear prediction model, it is very difficult to estimate a true resonant frequency without being influenced by frequency components other than the resonant frequency. Even when there is only one resonance point depending on the air pressure, it is very difficult to accurately estimate the resonance point by a low-order model such as the second-order model as in the method disclosed in the specification of Japanese Patent No. 3152151. Even when a time-series signal is subjected to a filtering process having a predetermined passband, it is still difficult to estimate the resonance point without being influenced by a change in the frequency characteristic.

In the case of the method disclosed in Japanese Unexamined Patent Publication No. 2005-14664, if resonant frequencies estimated under the completely same conditions and at a normal internal pressure are stored, a decrease in a tire air pressure can be accurately detected. However, it is difficult to run a vehicle at a normal internal pressure under all combinations of conditions. Consequently, when there is no resonant frequency (reference value) to be compared with, there is no choice but to make a comparison with a resonant frequency obtained by interpolation for example, thus high accuracy can not be expected.

SUMMARY OF THE INVENTION

The present invention has been made in view of the situation as described above. It is an objective of the present invention to provide an apparatus and a method for detecting a decrease in a tire pressure, and a program for detecting a tire having a decreased air pressure by which a frequency characteristic of a wheel rotation signal as a time-series signal can be estimated by a linear model more accurately.

In accordance with a first aspect of the present invention, there is provided an apparatus for detecting a decrease in a tire air pressure (hereinafter simply referred to as "detection apparatus") including:

a rotation velocity information detection means for periodically detecting tire rotation velocity information for the respective wheels of a vehicle;

a frequency characteristic estimate means for estimating, based on the rotation velocity information obtained by the rotation velocity information detection means, a frequency characteristic of the rotation velocity information; and a judgment means for judging, based on the estimated frequency characteristic, a decrease in the air pressure of the tire;

wherein the frequency characteristic estimate means includes, with regard to a time-series signal including the rotation velocity information, a parameter estimate means for performing a first step of subjecting parameters of a three-order or more linear model to a time-series estimate;

an input signal estimate means for performing a second step of estimating, based on the estimated linear model and the rotation velocity information that is an output signal of the linear model, an input signal to the linear model;

a parameter identification means for performing a third step of identifying, based on the estimated input signal and the rotation velocity information, parameters of a linear model caused to have a lower order of a second order; and a resonant frequency estimate means for performing a fourth step of estimating, based on the parameters identified based on the model caused to have a lower order of the second order, a resonant frequency of the tire in a torsional direction, and wherein the judgment means is configured to judge a tire having a decreased air pressure based on the estimated resonant frequency of the tire in the torsional direction.

In the detection apparatus according to the first aspect of the present invention, a time-series estimate is firstly performed by a high order linear model. Then, based on the estimated high order model and an output of a time-series signal including rotation velocity information, an unknown input signal is estimated. Then, based on the estimated input signal and the output signal, the model is caused to have a lower order of the second order to estimate a resonant frequency. As a result, depending on the vehicle velocity or the magnitude of the vibration from a road surface and without correcting the estimated resonant frequency, a resonant frequency of the tire in a torsional direction can be estimated stably and accurately.

Since the input signal is calculated, even if the model is made pass through a filter having a predetermined passband width such as a band-pass filter when the model is caused to have a lower order of the second order, the input and output signals can be both sent through the filter and thus only a predetermined band can be subjected to system identification without skewing the signals. Furthermore, since the model is caused to have a lower order of the second order, the calculation of the resonance point is simplified.

In accordance with a second aspect of the present invention, there is provided a detection apparatus including:

a rotation velocity information detection means for periodically detecting tire rotation velocity information for the respective wheels of a vehicle;

a rotation acceleration information computation means for computing tire rotation acceleration information based on the rotation velocity information obtained from the rotation velocity information detection means;

a frequency characteristic estimate means for estimating, based on the rotation acceleration information computed by the rotation acceleration information computation means, a frequency characteristic of the rotation acceleration information; and a judgment means for judging, based on the estimated frequency characteristic, a decrease in the air pressure of the tire;

wherein the frequency characteristic estimate means includes, with regard to a time-series signal including the rotation acceleration information, a parameter estimate means for performing a first step of subjecting parameters of a three-order or more linear model to a time-series estimate;

an input signal estimate means for performing a second step of estimating, based on the estimated linear model and the rotation acceleration information that is an output signal of the linear model, an input signal to the linear model;

a parameter identification means for performing a third step of identifying, based on the estimated input signal and the rotation acceleration information, parameters of a linear model caused to have a lower order of a second order; and a resonant frequency estimate means for performing a fourth step of estimating, based on the parameters identified based on the model caused to have a lower order of the second order, a resonant frequency of the tire in a torsional direction, and wherein the judgment means is configured to judge a decrease in a tire air pressure based on the estimated resonant frequency of the tire in the torsional direction.

As in the detection apparatus according to the first aspect, the detection apparatus according to the second aspect of the present invention also can stably and accurately estimate a resonant frequency of the tire in a torsional direction depending on the vehicle velocity or the magnitude of the vibration from a road surface and without correcting the estimated resonant frequency. Furthermore, since a time-series signal including rotation acceleration information having a smaller change than that of rotation velocity information is subjected to a time-series estimate, computation accuracy can be improved.

The apparatus preferably includes: a temperature sensor for detecting a temperature in the vicinity of the tire and a correction means for correcting, based on the temperature information detected by the temperature sensor, the estimated resonant frequency of the tire in the torsional direction. By correcting the resonant frequency based on the temperature in the vicinity of the tire, estimate accuracy can be improved.

The parameter estimate means is preferably configured to use the iterative least squares technique to subject parameters of a three-order or more linear model to a time-series estimate. The use of the iterative least squares technique can reduce the load required for the computation.

The parameter identification means is preferably configured to subject, when identifying a second-order linear model, the input signal and the output signal to a filtering process by a filter having a predetermined passband width. The use of the filtering process can remove signal components other than target components to improve the accuracy of the time-series estimate.

The parameter identification means is preferably configured to identify a second-order linear model by the iterative least squares technique. The use of the iterative least squares technique can reduce the load required for the computation.

In accordance with a third aspect of the present invention, there is provided a method of detecting a decrease in a tire air pressure (hereinafter simply referred to as "detection method") including:

a step of periodically detecting tire rotation velocity information for the respective wheels of a vehicle;

a step of estimating, based on the rotation velocity information obtained in the rotation velocity information detection step, a frequency characteristic of the rotation velocity information; and a step of judging, based on the estimated frequency characteristic, a decrease in the air pressure of the tire, wherein the step of estimating the frequency characteristic includes, with regard to a time-series signal including the rotation velocity information, a first step of subjecting parameters of a three-order or more linear model to a time-series estimate;

a second step of estimating an input signal to the linear model based on the estimated linear model and the rotation velocity information that is an output signal of the linear model;

a third step of identifying, based on the estimated input signal and the rotation velocity information, parameters of a linear model caused to have a lower order of a second order; and a fourth step of estimating, based on the parameters identified based on the model caused to have a lower order of the second order, a resonant frequency of the tire in a torsional direction, and wherein the step of judging a decrease in the air pressure of the tire is configured to judge a decrease in a tire air pressure based on the estimated resonant frequency of the tire in the torsional direction.

In the detection method according to the third aspect of the present invention, a time-series estimate is firstly performed by a high order linear model. Then, based on the estimated high order model and an output of a time-series signal including rotation velocity information, an unknown input signal is estimated. Then, based on the estimated input signal and the output signal, the model is caused to have a lower order of the second order to estimate a resonant frequency. As a result, depending on the vehicle velocity or the magnitude of the vibration from a road surface and without correcting the estimated resonant frequency, a resonant frequency of the tire in a torsional direction can be estimated stably and accurately.

Since the input signal is calculated, even if the model is made pass through a filter having a predetermined passband width such as a band-pass filter when the model is caused to have a lower order of the second order, the input and the output signals can be both sent through the filter and thus only a predetermined band can be subjected to system identification without skewing the signals. Furthermore, since the model is caused to have a lower order of the second order, the calculation of the resonance point is simplified.

In accordance with a fourth aspect of the present invention, there is provided a detection method including:

a step of periodically detecting tire rotation velocity information for the respective wheels of a vehicle;

a step of computing tire rotation acceleration information based on the rotation velocity information obtained in the rotation velocity information detection step;

a step of estimating, based on the rotation acceleration information computed in the rotation acceleration information computation step, a frequency characteristic of the rotation acceleration information; and a step of judging, based on the estimated frequency characteristic, a decrease in the air pressure of the tire, wherein the step of estimating the frequency characteristic includes, with regard to a time-series signal including the rotation acceleration information:

a first step of subjecting parameters of a three-order or more linear model to a time-series estimate;

a second step of estimating an input signal to the linear model based on the estimated linear model and the rotation acceleration information that is an output signal of the linear model;

a third step of identifying, based on the estimated input signal and the rotation acceleration information, parameters of a linear model caused to have a lower order of a second order; and a fourth step of estimating, based on the parameters identified based on the model caused to have a lower order of the second order, a resonant frequency of the tire in a torsional direction, and wherein the step of judging a decrease in the air pressure of the tire is configured to judge, based on the estimated resonant frequency of the tire in the torsional direction, a decrease in a tire pressure.

As in the detection method according to the third aspect, the detection method according to the fourth aspect of the present invention also can stably and accurately estimate a resonant frequency of the tire in a torsional direction depending on the vehicle velocity or the magnitude of the vibration from a road surface and without correcting the estimated resonant frequency. Furthermore, since a time-series signal including rotation acceleration information having a smaller change than that of rotation velocity information is subjected to a time-series estimate, computation accuracy can be improved.

The method preferably further includes a step of correcting, based on the temperature information from the temperature sensor for detecting a temperature in the vicinity of the tire, the estimated resonant frequency of the tire in the torsional direction. By correcting the resonant frequency based on the temperature in the vicinity of the tire, the estimate accuracy can be improved.

The step of estimating parameters preferably uses the iterative least squares technique to subject parameters of a three-order or more linear model to a time-series estimate. The use of the iterative least squares technique can reduce the load required for the computation.

The step of identifying parameters preferably subjects, when identifying the second-order linear model, the input signal and the output signal to a filtering process by a filter having a predetermined pass bandwidth. The use of the filtering process can remove signal components other than target components to improve the accuracy of the time-series estimate.

The step of identifying parameters preferably uses the iterative least squares technique to identify a second-order linear model. The use of the iterative least squares technique can reduce the load required for the computation.

In accordance with a fifth aspect of the present invention, there is provided a program for detecting a decrease in a tire air pressure (hereinafter simply referred to as "program") for causing, in order to detect a decreased air pressure of a tire of a running vehicle based on a resonant frequency of the tire, a computer to function as a frequency characteristic estimate means for estimating, based on a rotation velocity information obtained by a rotation velocity information detection means for periodically detecting tire rotation velocity information for the respective wheels of a vehicle, a frequency characteristic of the rotation velocity information and a judgment means for judging, based on the estimated frequency characteristic, a decrease in the air pressure of the tire, wherein the frequency characteristic estimate means includes, with regard to a time-series signal including the rotation velocity information:

a parameter estimate means for performing a first step of subjecting parameters of a three-order or more linear model to a time-series estimate;

an input signal estimate means for performing a second step of estimating, based on the estimated linear model and the rotation velocity information that is an output signal of the linear model, an input signal to the linear model;

a parameter identification means for performing a third step of identifying, based on the estimated input signal and the rotation velocity information, parameters of a linear model caused to have a lower order of a second order; and a resonant frequency estimate means for performing a fourth step of estimating, based on the parameters identified based on the model caused to have a lower order of the second order, a resonant frequency of the tire in a torsional direction, and wherein the judgment means is configured to judge a decrease in a tire air pressure based on the estimated resonant frequency of the tire in the torsional direction.

In accordance with a sixth aspect of the present invention, there is provided a program for causing, in order to detect a decreased air pressure of a tire of a running vehicle based on a resonant frequency of the tire, a computer to function as a rotation acceleration information computation means for computing tire rotation acceleration information based on rotation velocity information obtained by a rotation velocity information detection means for periodically detecting tire rotation velocity information for the respective wheels of a vehicle, a frequency characteristic estimate means for estimating, based on the rotation acceleration information computed by the rotation acceleration information computation means, a frequency characteristic of the rotation acceleration information, and a judgment means for judging, based on the estimated frequency characteristic, a decrease in the air pressure of the tire, wherein the frequency characteristic estimate means includes, with regard to a time-series signal including the rotation acceleration information, a parameter estimate means for performing a first step of subjecting parameters of a three-order or more linear model to a time-series estimate;

an input signal estimate means for performing a second step of estimating, based on the estimated linear model and the rotation acceleration information that is an output signal of the linear model, an input signal to the linear model;

a parameter identification means for performing a third step of identifying, based on the estimated input signal and the rotation acceleration information, parameters of a linear model caused to have a lower order of a second order; and a resonant frequency estimate means for performing a fourth step of estimating, based on the parameters identified based on the model caused to have a lower order of the second order, a resonant frequency of the tire in a torsional direction, and wherein the judgment means is configured to judge a decrease in a tire air pressure based on the estimated resonant frequency of the tire in the torsional direction.

DETAILED DESCRIPTION

Hereinafter, with reference to the attached drawings, embodiments of a detection apparatus and a detection method, and a program of the present invention will be described in detail.

Figure 1:
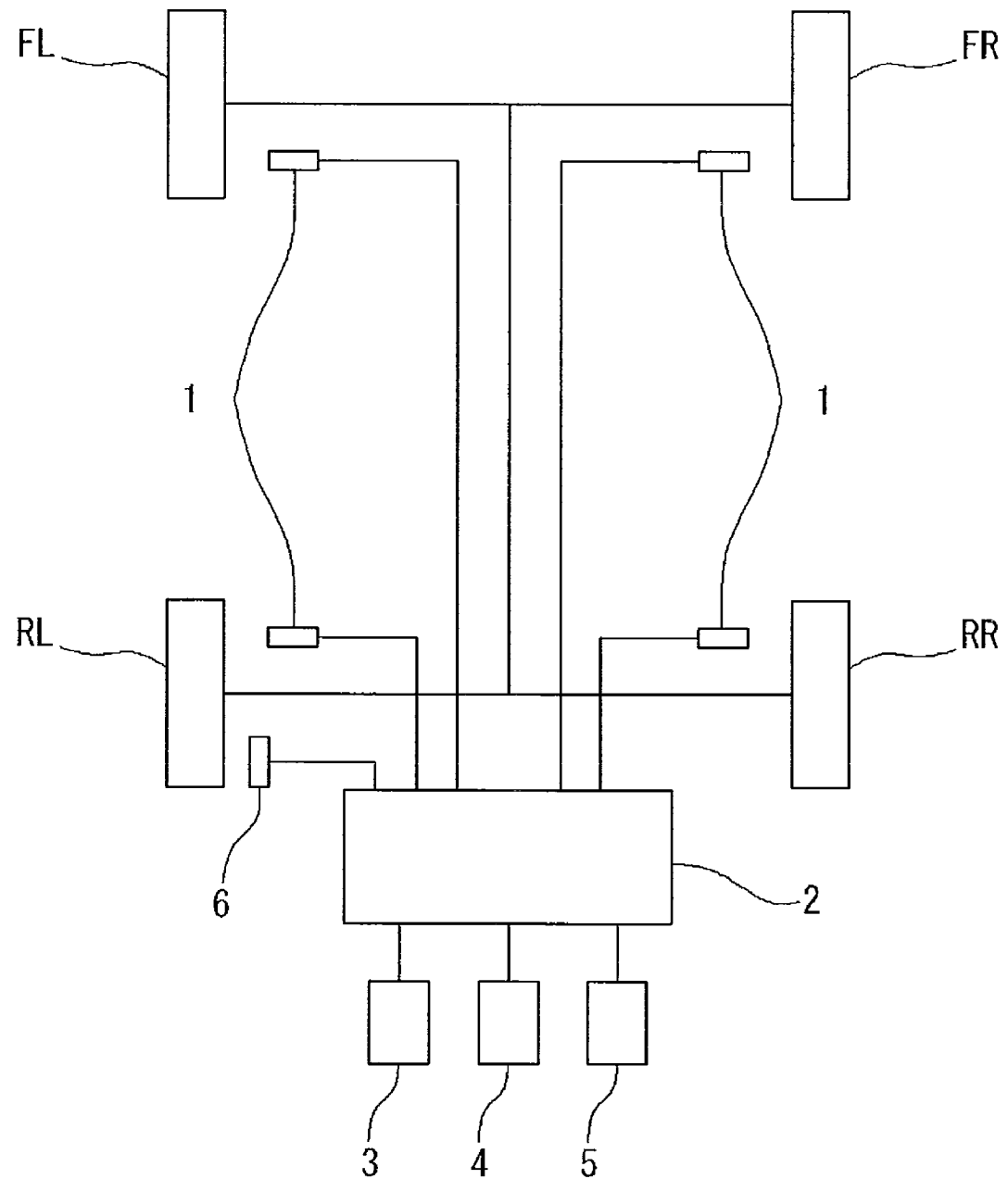
FIG. 1 is a block diagram illustrating one embodiment of a detection apparatus of the present invention.

As shown in FIG. 1, a detection apparatus according to one embodiment of the present invention includes a normal wheel speed detection means (rotation velocity information detection means) 1 provided in association with the respective tires in order to detect the rotation velocity information regarding four tires of FL (left front wheel), FR (right front wheel), RL (left rear wheel), and RR (right rear wheel) provided in a four-wheel vehicle.

The wheel speed detection means 1 may be, for example, a wheel speed sensor that uses an electromagnetic pickup for example to generate rotation pulses to measure an angular velocity and a wheel speed based on the number of pulses or an angular velocity sensor by which power is generated by rotation as in a dynamo and an angular velocity and a wheel speed are measured based on the voltage. An output from the wheel speed detection means 1 is given to a control unit 2 such as ABS that is a computer for example. This control unit 2 is connected, for example, to a display unit 3 composed of a liquid crystal display element, a plasma display element or CRT for displaying a tire having a decreased internal pressure; an initialization button 4 that can be driven by a driver; an alarming unit 5 for notifying a driver of a tire having a decreased internal pressure; and a temperature sensor 6 for detecting a temperature in the vicinity of a tire.

Figure 2:
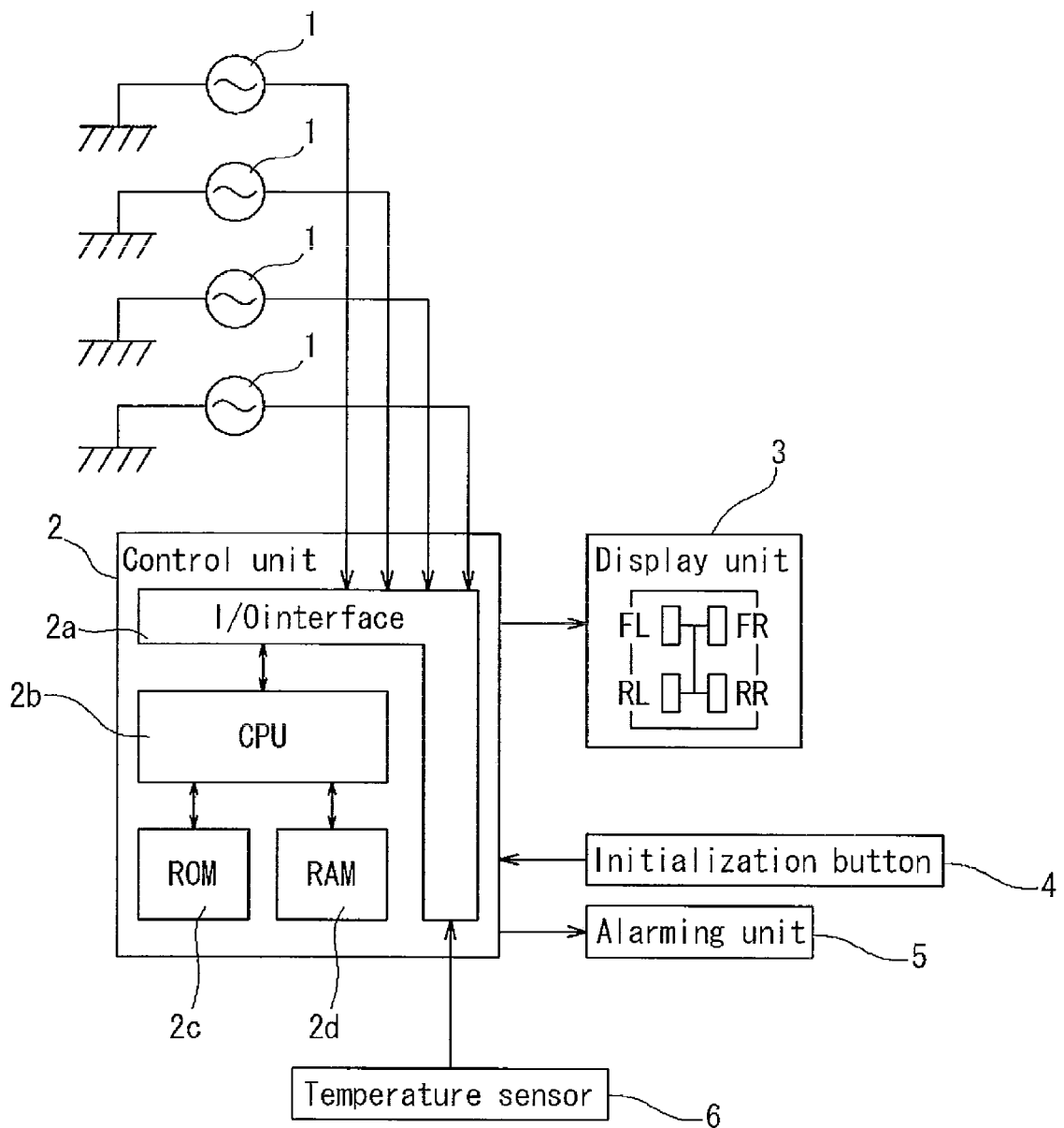
FIG. 2 is a block diagram illustrating an electrical configuration of the detection apparatus shown in FIG. 1.

As shown in FIG. 2, the control unit 2 is composed of: an I/O interface 2a required for the exchange of a signal with an external apparatus; a CPU 2b functioning as a center of a computation process; a ROM 2c in which a control operation program of this CPU 2b is stored; and a RAN 2d to which data is temporarily written or from which the written data is read out when the CPU 2b performs a control operation.

The wheel speed detection means 1 outputs a pulse signal corresponding to the rotation number of a tire (hereinafter referred to as "wheel speed pulse"). Then, this wheel speed pulse can be resampled at a predetermined sampling cycle$\Delta T$ (sec) (e.g., $\Delta T$=0.005 second) to obtain time-series data on a wheel speed signal. The sampling cycle must be equal to or higher than about tens of heltz because the resonant frequency of a target tire in the torsional direction appears in the vicinity of about tens of heltz.

The detection apparatus according to this embodiment is mainly composed of: the wheel speed detection means (rotation velocity information detection means) 1; a frequency characteristic estimate means for estimating, based on the rotation velocity information obtained from this wheel speed detection means, a frequency characteristic of the rotation velocity information; and a judgment means for judging a decrease in a tire air pressure based on the estimated frequency characteristic. A program for detecting a decrease in a tire air pressure causes the control unit 2 to function as the frequency characteristic estimate means and the judgment means. The frequency characteristic estimate means includes, with regard to a time-series signal including the rotation velocity information: a parameter estimate means for performing the first step of estimating a parameter of the three-order or higher linear model; an input signal estimate means for performing the second step of estimating, based on the estimated linear model and the rotation velocity information that is an output signal of the linear model, an input signal to the linear model; a parameter identification means for performing the third step of identifying, based on the estimated input signal and the rotation velocity information, the parameter of the linear model caused to have a lower order of the second order; and a resonant frequency estimate means for performing the fourth step of estimating, based on the parameter identified based on the linear model caused to have a lower order of the second order, the resonant frequency of the tire in the torsional direction. The detection apparatus also includes a correction means for correcting the estimated resonant frequency based on a temperature in the vicinity of the tire.

In the present invention, wheel rotation signals are estimated as time-series signals to which parameters of a linear model having a higher order (an order of an integer of 3 or more) are once subjected to a time-series estimate. Next, based on the respective estimated parameters and time-series signals of the rotation of the wheel as output signals, an unknown input signal is estimated. Then, the estimated input signal and the output signal are used to subject the linear model to system identification. The following section will describe in detail, as a feature of the present invention, the step of estimating a frequency characteristic including its background.

[Step of Estimating Frequency Characteristic]

When an assumed system model is identified and when an input signal and an output signal are obtained, the input and the output signals are generally used to perform system identification. When only an output signal (wheel rotation signal) is obtained as in the present invention however, a method is used in which the input is assumed as white noise to perform time-series estimate to identify the system.

When a vibration component included in a wheel rotation signal is used as a model and is identified, a tire is generally assumed as the second-order model composed of a spring and a bumper and this model is identified.

However, an actual wheel rotation signal includes various vibrations. To solve this, it is general to send a wheel rotation signal through a filter through which only a target frequency band can pass to remove an unnecessary vibration component and the remaining vibration components are subjected to system identification. Such a filter through which only a target frequency can pass is used that allows only a rotation signal in the vicinity of about tens of heltz to pass therethrough because a resonant component of the tire in the torsional direction depends on the internal pressure of the tire. As a result, a signal having passed the filter includes only one resonant component. Thus, the second-order linear model may be considered to be sufficient. The specification of Japanese Patent No. 3152151 also uses the second-order linear model.

However, when time-series estimate that can provide only an output signal is performed with a filter having a predetermined passband (band-pass filter), a signal having passed through the filter tends to move to the center frequency of the filter, causing a disadvantage that the signal is dislocated from an actual resonance point. This tendency is remarkable as the passband width is narrower.

On the other hand, it is known that, although a resonant component of the tire in the torsional direction actually changes while depending on the tire internal pressure, a vibration component included in a wheel rotation signal significantly changes depending on the vehicle velocity or the concavity and convexity of road for example. Thus, when a filter has an extremely-wide passband width in order to avoid the resultant signal from being dislocated from the resonance point, a disadvantage is caused where vibration components other than a torsional resonance component cannot be sufficiently removed, thus causing a decreased accuracy in the time-series estimate.

Figure 4:
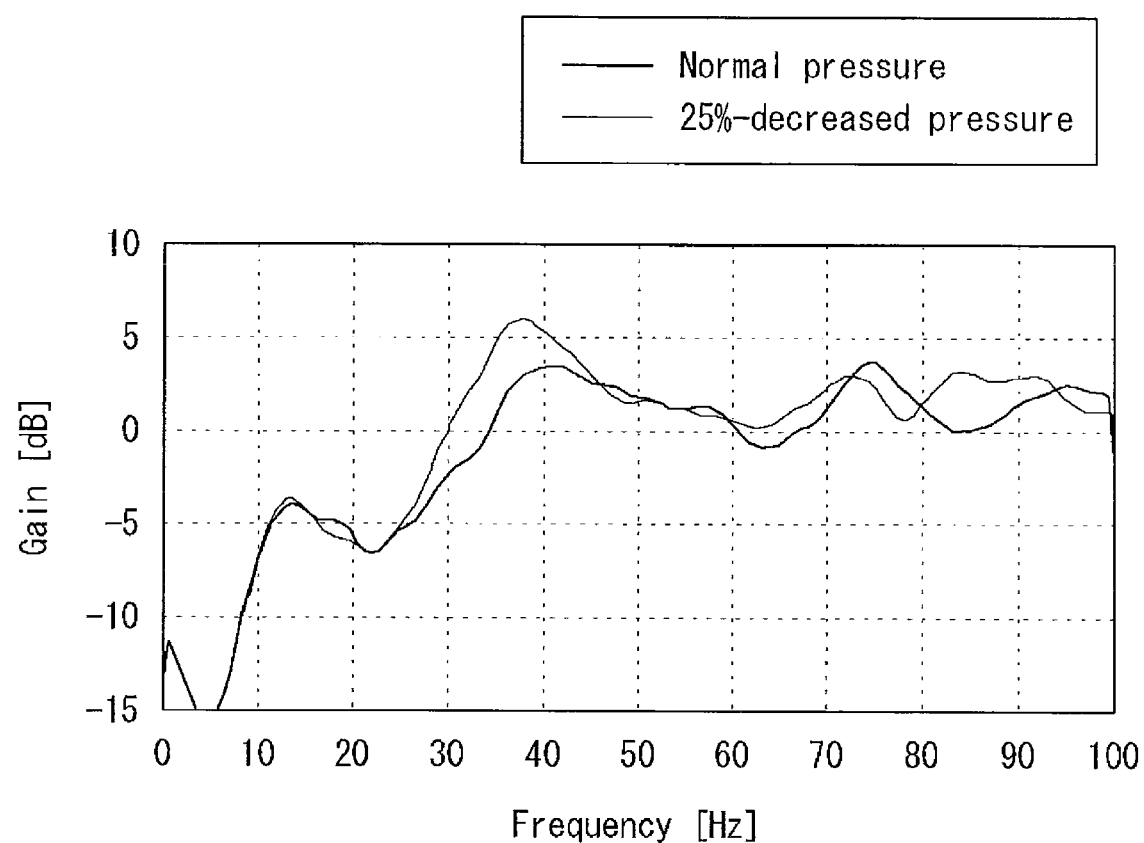
FIG. 4 illustrates a frequency characteristic by the fast Fourier transform of the rotation acceleration signal of a wheel.

The above disadvantages will be specifically described with reference to FIG. 4 to FIG. 7. FIG. 4 illustrates a frequency characteristic of wheel rotation signals obtained by the fast Fourier transform (FFT). As can be seen from FIG. 4, the decreased tire air pressure (25%-decreased pressure) causes a resonance point in the vicinity of 40 Hz to shift in a reduced direction. This resonance point in the vicinity of 40 Hz is a resonant frequency component of the tire in the torsional direction. Also as can be seen from FIG. 4, many resonance points other than the one in the vicinity of 40 Hz also exist.

Figure 5:
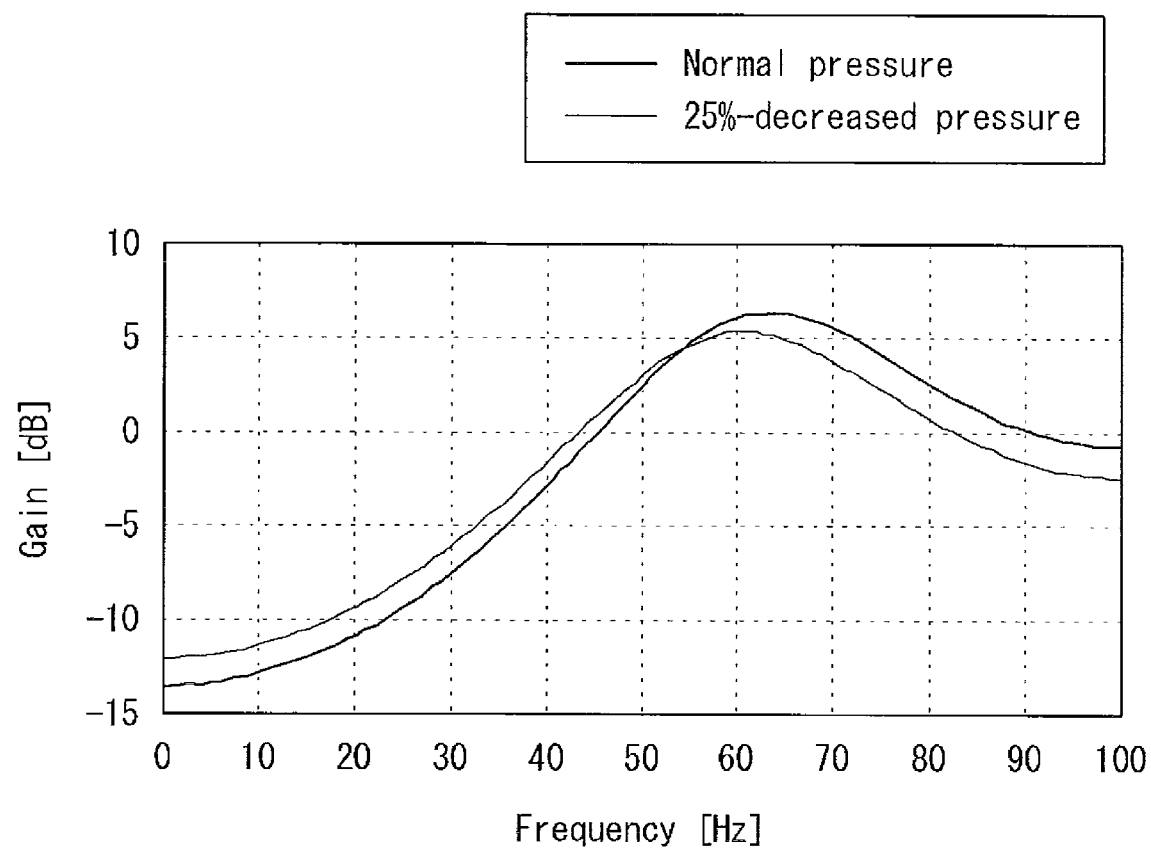
FIG. 5 illustrates a frequency characteristic of the estimate result by the second-order linear model of a wheel rotation acceleration signal in FIG. 4.

FIG. 5 illustrates a frequency characteristic obtained by subjecting the wheel rotation signal obtained in FIG. 4 to the time-series estimate based on the second-order linear model without subjecting the signal to a filtering process. In this case, a difference in the tire air pressure can be confirmed. However, since vibration components included in all wheel rotation signals are estimated based on the second-order model, the absolute value of the resonant frequency is significantly dislocated. The reason is that, even when a tire air pressure is normal and resonant frequencies in the torsional direction are uniform, when a change in the velocity causes a change in the entire frequency characteristic, the estimated second-order model also changes. Thus, it is required to accurately determine whether a changed resonance point is caused by a decreased tire pressure or other causing factors. However, this determination is very difficult because there is no feature quantity useful for the determination.

Figure 6:
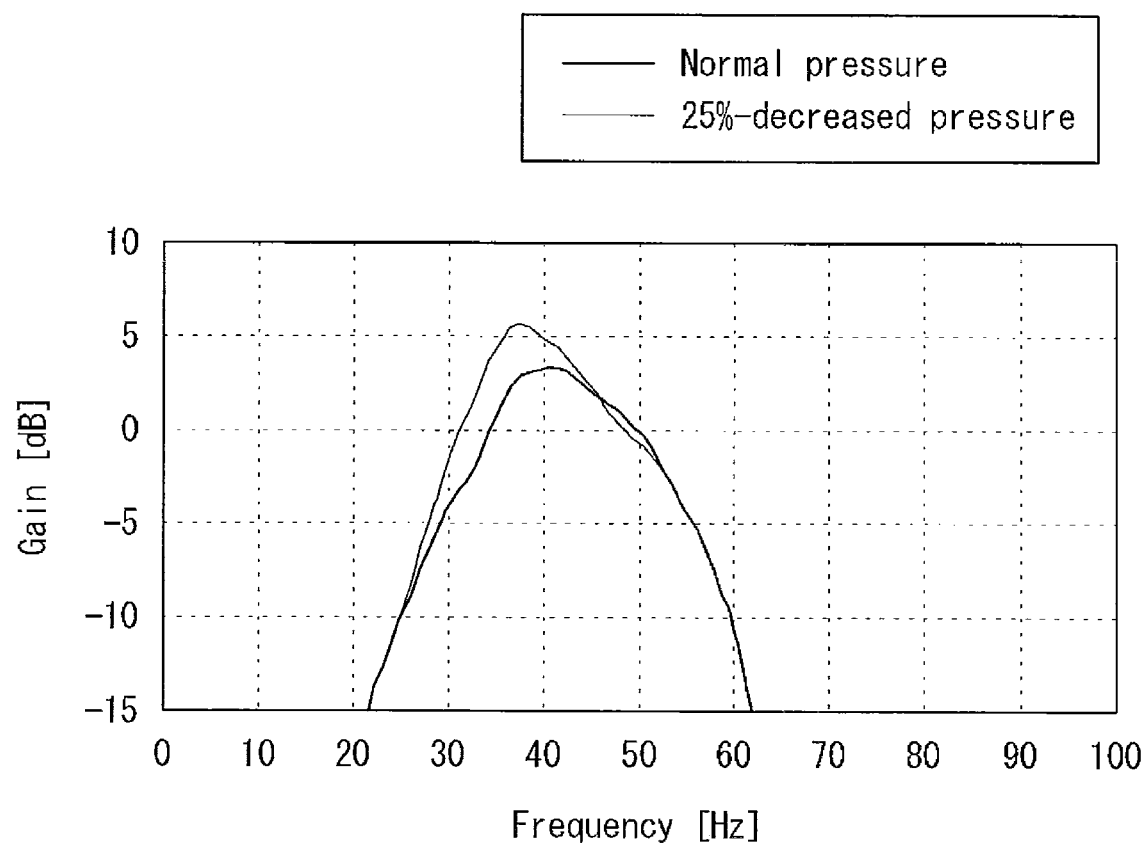
FIG. 6 shows the result of subjecting, to the fast Fourier transform, a signal obtained by subjecting the wheel rotation acceleration signal in FIG. 4 to a filtering process.
Figure 7:
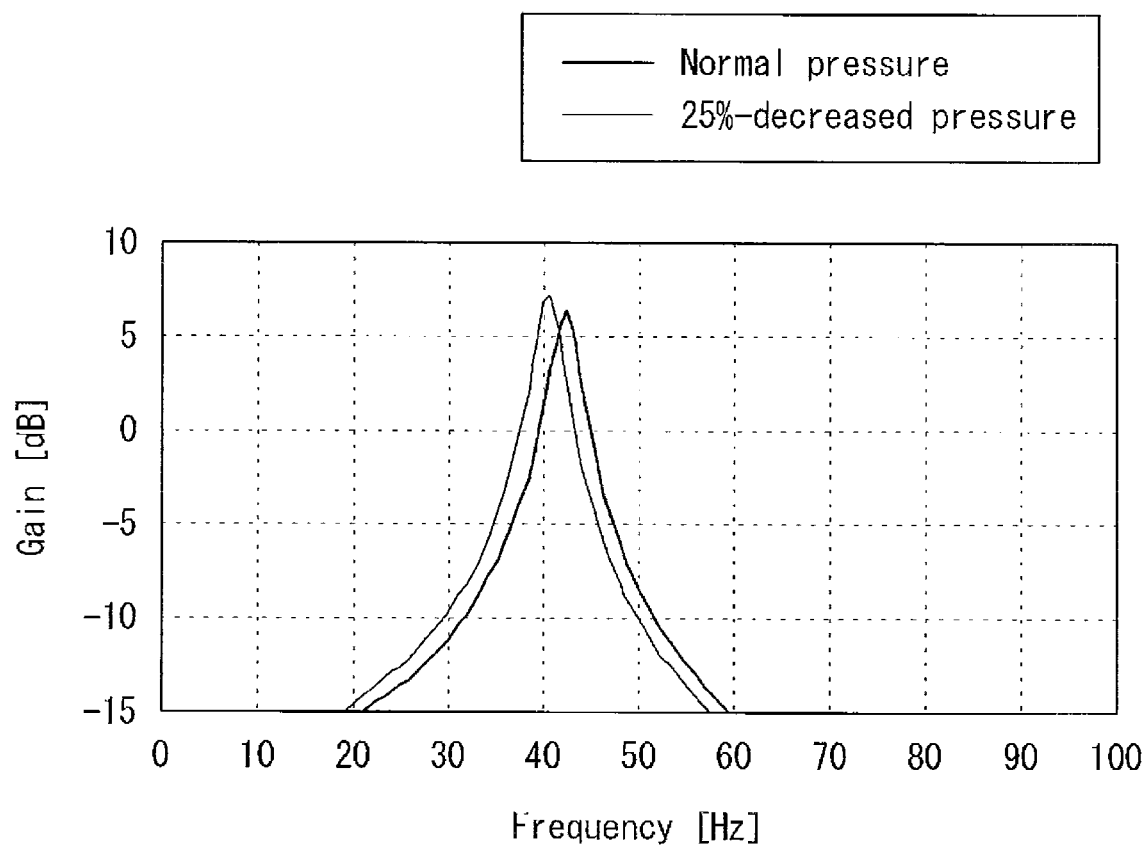
FIG. 7 illustrates the frequency characteristic obtained by subjecting the signal obtained through the filtering process in FIG. 6 to the time-series estimate by the second-order linear model.

FIG. 6 illustrates the result of FFT obtained by subjecting the wheel rotation signal of FIG. 4 to a band-pass filtering having a passband width of 20 to 55 Hz. FIG. 7 illustrates a frequency characteristic obtained by subjecting the signal of FIG. 6 to the time-series estimate based on the second-order linear model. When this frequency characteristic is compared with that of FIG. 5, absolute values of resonant frequencies are close to those of actual resonant frequencies but there is still a slight difference therebetween. As described above, so long as a resonant frequency of an actual signal cannot be accurately estimated, even when the estimated resonance point of the second-order model changes, it is required to determine whether this change is caused by a change in the tire internal pressure or other causing factors (e.g., vehicle velocity, concavity and convexity of a road), thus making it difficult to accurately detect a decrease in a tire air pressure In contrast with the above methods, the present invention once subjects, even when a tire model can be approximated by the second-order system, the tire model to the time-series estimate based on a high-order model to estimate an input signal based on the resultant high-order parameter and an output signal to subject the second-order model using the estimated input signal and the output signal to the system identification.

This input signal provides advantages such as the one in which, even when a model is caused to have a lower order of the second order and is caused to pass though a filter having a predetermined passband width such as a band-pass filter, the input and the output signals can be both subjected to the filtering and thus only a predetermined band can be subjected to the system identification without skewing the signals.

The reason why a model is caused to have a lower order of the second order in the present invention is to simplify the calculation of a resonance point. Specifically, it is not easy to calculate, based on a parameter obtained in a high-order model, a peak frequency in the vicinity of 40 Hz which is a resonance point of a tire in the torsional direction, because this calculation requires a complicated computation processing. Another reason why a model is caused to have a lower order of the second order to estimate a resonant peak frequency is that the computer resource can be saved.

Figure 3:
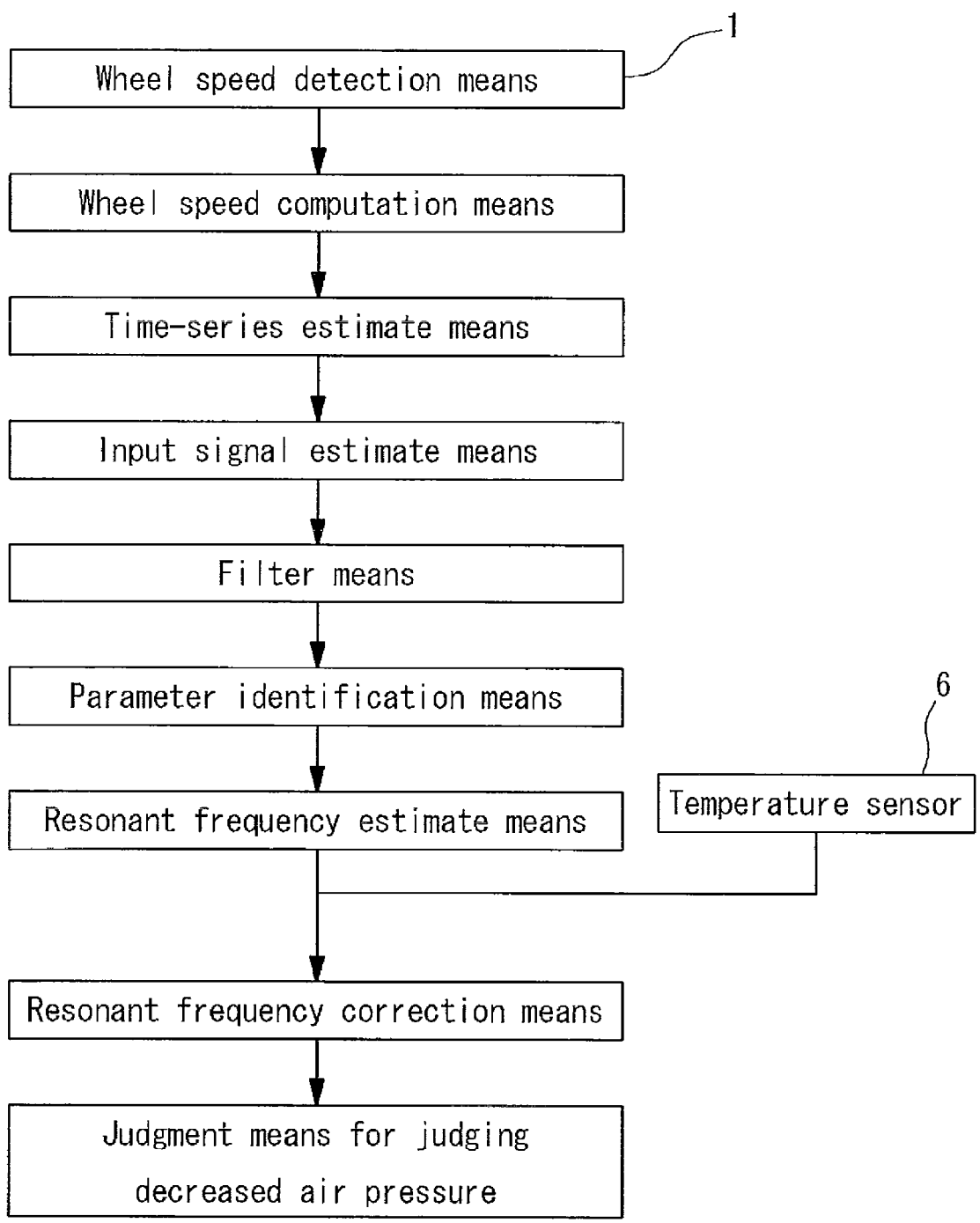
FIG. 3 is a block diagram illustrating the functional configuration of the detection apparatus according to one embodiment of the present invention.

Next, the operation of the detection apparatus of this embodiment will be described sequentially. FIG. 3 is a block diagram illustrating the functional configuration of the detection apparatus of this embodiment.

(1) First, the wheel speed detection means detects a rotation signal of a wheel.

(2) Next, the rotation signal of the wheel is resampled based on a predetermined sampling cycle to obtain time-series data on a wheel speed signal. The sampling cycle must be equal to or higher than about tens of heltz because the resonant frequency of a target tire in the torsional direction appears in the vicinity of about tens of heltz.

(3) Next, the resultant wheel speed is subjected to differentiation to obtain wheel acceleration. It is also possible to use the wheel speed data as time-series data to subject the data to a time-series analysis. However, since the wheel acceleration data has a smaller change than that of the wheel speed data, wheel acceleration data assumed as time-series data is more preferred because the computation accuracy can be improved.

(4) Next, the computed wheel rotation acceleration data is used as time-series data and the data is subjected to a time-series analysis.

First, the first step assumes the rotation acceleration data as a time-series signal, and the respective parameters of an $n^{th}$ linear model having the following formula (1) (n is an integer of 3 or more) are subjected to the time-series estimate by the time-series estimate means. The time-series estimate is preferably performed by the iterative least squares technique from the viewpoint of a computer resource.

$$y(k) = \sum_{i=1}^{n} a_i y(k-i) + w(k) \quad (1)$$

In the formula, y(k) denotes a time-series signal of wheel rotation acceleration, n denotes an order of the model (an integer of 3 or more), $a_i$ denotes each parameter, and w(k) denotes a disturbance.

Figure 8:
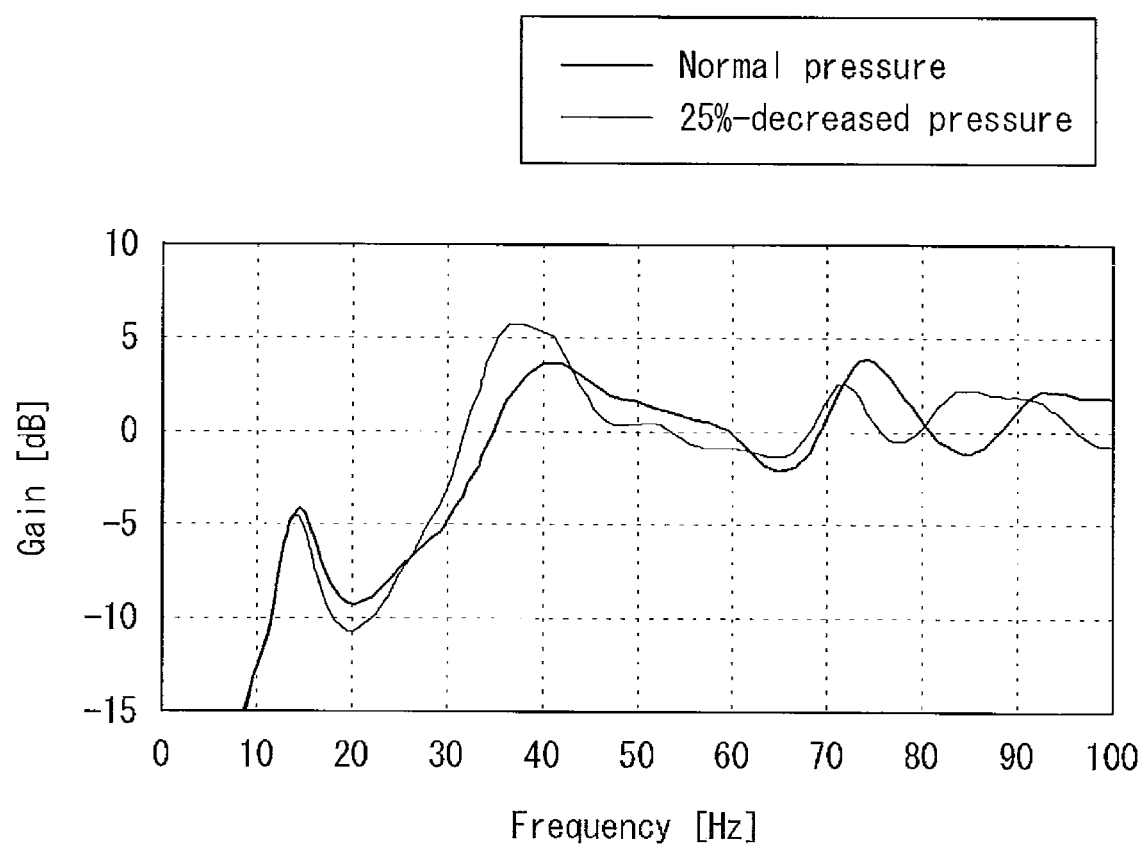
FIG. 8 illustrates the frequency characteristic obtained by subjecting the wheel rotation acceleration signal in FIG. 4 to the time-series estimate by the $20^{th}$-order linear model.

FIG. 8 illustrates the frequency characteristic obtained by subjecting the time-series signal of the wheel rotation acceleration in FIG. 4 to the time-series estimate by the $20^{th}$ linear model. As can be seen from FIG. 8, the frequency characteristic of FIG. 4 obtained by the fast Fourier transform can be estimated accurately.

(5) Next, in the second step, based on the respective parameters estimated in the first step and the time-series signal y(k) of wheel rotation acceleration as an output signal, the input signal estimate means estimates an input.

Specifically, in the time-series estimate in the first step, the input to the system is defined as a disturbance w(k). This disturbance w(k) is assumed as a white-noise-like force given to the tire from the road. Such a disturbance w(k) (i.e., an input signal) is estimated based on the following formula (2) based on the respective parameters estimated in the first step and the time-series signal of the vehicle wheel rotation acceleration.

$$w(k) = y(k) - \sum_{i=1}^{n} a_i y(k-i) \quad (2)$$

(6) Next, in the third step, based on the input signal w(k) estimated in the second step and the time-series signal y(k) of the wheel rotation acceleration as an output signal, the parameter identification means identifies parameters of the second-order model. The then transfer function G(z) can be represented by the following formula (3).

$$G(z) = \frac{c_0 z^2 + c_1 z + c_2}{z^2 + b_1 z + b_2}$$

$$= \frac{c_0 + c_1 z^{-1} + c_2 z^{-2}}{1 + b_1 z^{-1} + b_2 z^{-2}} \quad (3)$$

In the formula, $z^{-1}$ represents one sample delay.

When the parameter of the linear model is caused to have a lower order of the second order; in order to focus attention on a resonant frequency of the tire in particular, an input signal and an output signal are preferably subjected to a filtering process by a filter means having a predetermined passband width and are subsequently subjected to system identification.

Figure 9:
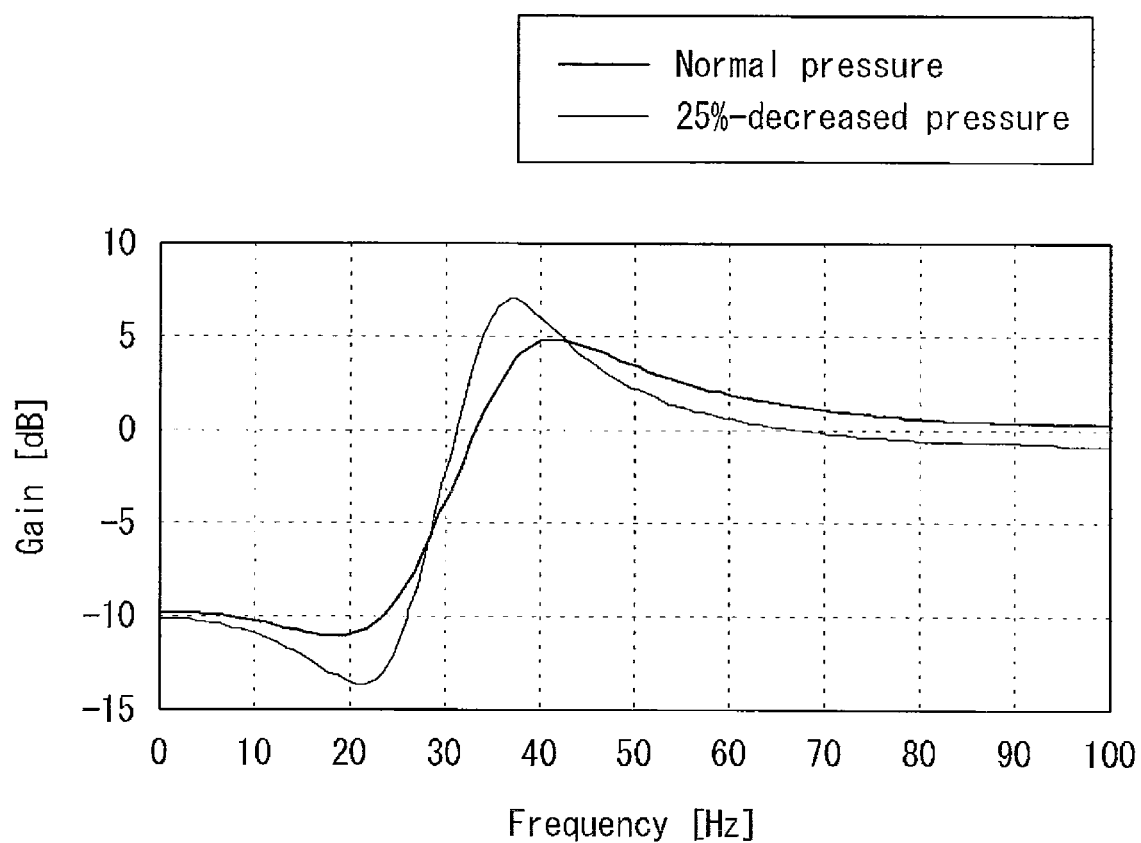
FIG. 9 illustrates the frequency characteristic based on estimated parameters obtained by subjecting input and output signals subjected to a filtering process to system identification.
Figure 10:
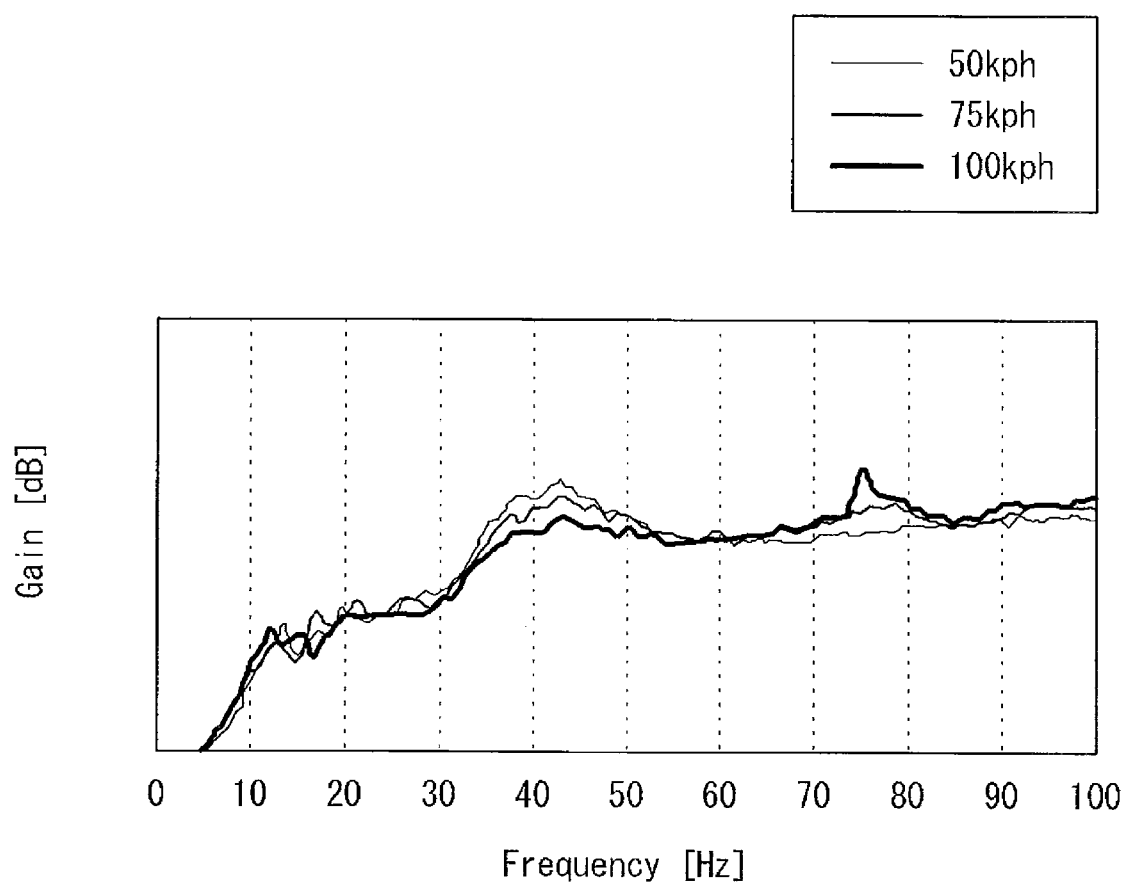
FIG. 10 illustrates the frequency characteristic in a tire torsional direction when the vehicle velocity is changed.
Figure 11:
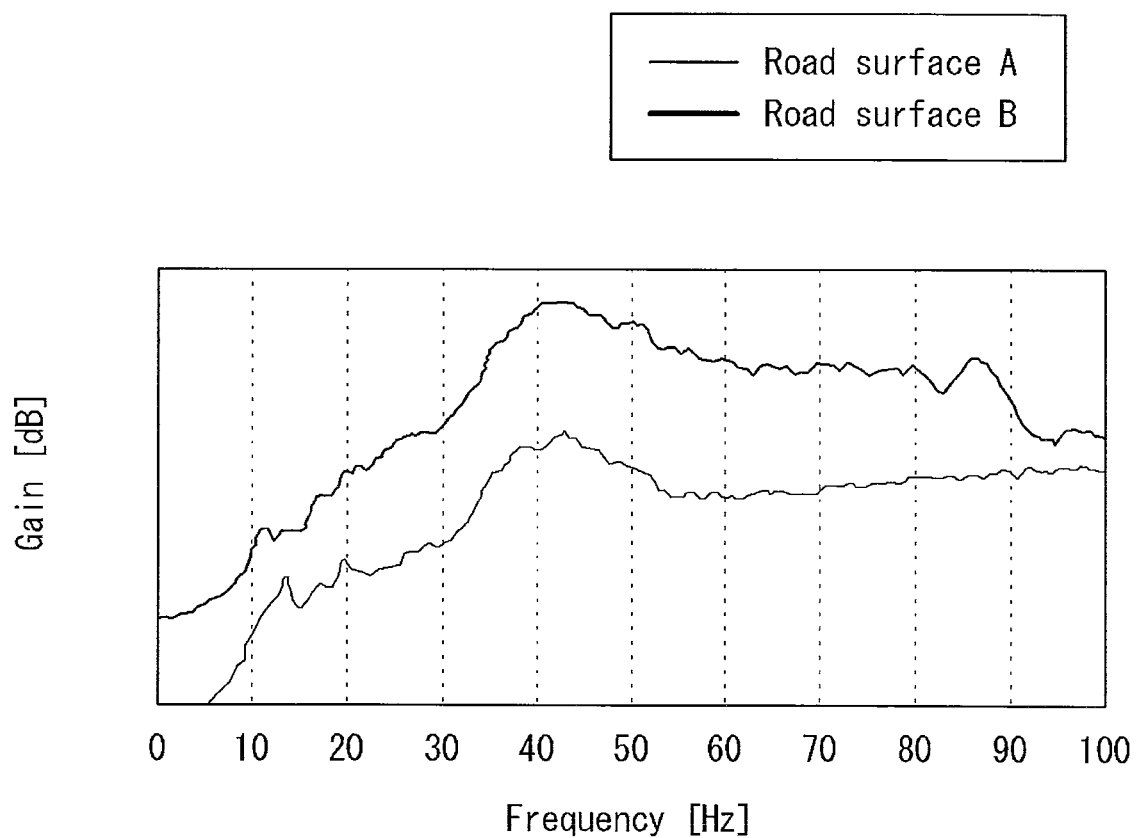
FIG. 11 illustrates the frequency characteristic in the tire torsional direction when a road on which vehicle runs is changed.

FIG. 9 illustrates the frequency characteristic based on estimated parameters obtained by subjecting input and output signals to a filtering process by a band-pass filter having a passband width of 20 to 55 Hz and by subjecting the filtered signals to the system identification. As can be seen from FIG. 9, the frequency characteristic is accurately estimated when compared to the frequency characteristic of FIG. 8 of 20 to 55 Hz.

(7) Next, based on the parameter of the model caused to have a lower order of the second order, the resonant frequency estimate means estimates the resonant frequency. When a resonance characteristic is approximated to a continuous-time second-order model (4), the resonant frequency is represented by the following formula (5).

$$G(s) = \frac{\omega_n^2}{s^2 + 2\xi\omega_n s + \omega_n^2} \quad (4)$$

$$\omega_p = \omega_n \sqrt{1 - 2\xi^2} \quad (5)$$

In the formula, $\omega_n$ denotes a unique number of vibration, $\zeta$ denotes an attenuation coefficient, and $\omega_p$ denotes a resonant frequency.

(8) Based on the temperature information from a temperature sensor (e.g., in-vehicle outside air temperature sensor) for detecting a temperature in the vicinity of a tire, the estimated resonant frequency of the tire in the torsional direction is corrected. The purposes of this correction will be described below. When the surrounding temperature of the tire increases, the rubber constituting the tire has a lower hardness to consequently cause a reduced rigidity of the tire in the torsional direction, causing the resonant frequency to shift in a reduced direction. One purpose of this correction is to correct this shift. When the surrounding temperature of the tire declines on the other hand, the hardness of the rubber constituting the tire increases on the contrary to consequently cause an increased rigidity of the tire in the torsional direction, causing the resonant frequency to shift in an increased direction. Another purpose of this correction is to correct this shift.

Optimal temperature information is information on the temperature of a side wall of a tire. However, information for the atmosphere temperature of the tire or the outside air temperature also may be practically used. The correction is performed by the following formula (6) in which an estimated resonant frequency is $\omega_p$, a correction coefficient is $\alpha$, a corrected resonant frequency is $\omega_{pp}$, and the surrounding temperature of the tire is Temp.

$$\omega_{pp} = \omega_p - \alpha \times T_{emp} \quad (6)$$

(9) When the corrected resonant frequency is smaller than the predetermined value, it is determined that the tire air pressure is decreased to raise an alarm to the driver. Another configuration also may be used in which, when a tire is exchanged with a new tire or when a tire pressure is adjusted, an initialization button can be operated to learn the resonant frequency of the tire in the torsional direction under a reference internal pressure so that the resonant frequency value at the operation of the initialization button can be learned and stored as a reference value. This reference value can be used, when the resonant frequency decreases by a predetermined value from the reference value, to alarm a decrease in the air pressure.

Next, an illustrative embodiment of a detection method of the present invention will be described. However, the present invention is not limited to such an illustrative embodiment.

REFERENCE EXAMPLE

Tires were attached to a two-wheel driving vehicle (FF) and the vehicle was caused to run over an asphalt road. The rotation information for the tires of the respective wheels was sampled at every 0.005 second to obtain the time-series data of wheel speed signals. Next, the resultant wheel speed was subjected to differentiation to obtain wheel acceleration.

The resultant wheel rotation acceleration data was assumed as time-series data and was subjected to a fast Fourier transform to estimate a resonant frequency.

Next, the left front wheel was caused to have a 25%-decreased pressure and a resonant frequency was estimated in the same manner as the above-described one. The resultant frequency characteristic is shown in FIG. 4.

EXAMPLE

As in the reference example, wheel acceleration was obtained and the computed wheel rotation acceleration data was assumed as time-series data and the data was subjected to a time-series analysis. First, the respective parameters of the $20^{th}$ linear model were subjected to time-series estimate. Next, based on the respective estimated parameters and the time-series signal for the wheel rotation acceleration as the output signal, an input was estimated. Next, the input and output signals were subjected to a filtering process by a band-pass filter having a passband width of 20 to 55 Hz. Based on the input and output signals subjected to the filtering process, parameters of the second-order model were identified to estimate a resonant frequency. The resultant frequency characteristic is shown in FIG. 9.

COMPARATIVE EXAMPLE 1

As in the reference example, the wheel acceleration was obtained and the computed wheel rotation acceleration data was used as time-series data and was subjected to a time-series analysis. Specifically, a resonant frequency was estimated based on the second-order linear model. The resultant frequency characteristic is shown in FIG. 5.

COMPARATIVE EXAMPLE 2

As in the reference example, the wheel acceleration was obtained and the computed wheel rotation acceleration data was used as time-series data and was subjected to a time-series analysis. Specifically, the wheel rotation acceleration data was subjected to a process by a band-pass filter having a passband width of 20 to 55 Hz. Then, a resonant frequency was estimated based on the second-order linear model. The resultant frequency characteristic is shown in FIG. 7.

Table 1 shows the resonant frequencies obtained in Reference Example, Example, and Comparative Examples 1 to 2.

TABLE 1

| | Resonant frequency at normal air pressure [Hz] | Resonant frequency when left front wheel has a 25%-decreased pressure [Hz] |
|---|---|---|
| Reference Example (FIG. 4) | 40.9 | 37.1 |
| Example (FIG. 9) | 41.2 | 36.5 |
| Comparative Example 1 (FIG. 5) | 63.2 | 60.3 |
| Comparative Example 2 (FIG. 7) | 42.2 | 40.5 |

As can be seen from Table 1, an absolute value of a resonant peak frequency in the vicinity of 40 Hz can be accurately estimated by once subjecting the parameters of the 20th linear model to the time-series estimate to subsequently estimate an input signal based on the respective estimated parameters and the time-series signal of the wheel rotation acceleration that is the output signal, and by using the estimated input signal and the output signal to subject the linear model to system identification again (Example). In Comparative Example 1, the resonant frequency significantly shifts in an increased direction both at a normal pressure and a decreased pressure. In Comparative Example 2, although not so remarkable as in Comparative Example 1, the resonant frequency similarly shifts in an increased direction both at a normal pressure and a decreased pressure. Thus, the resonant frequency cannot be accurately estimated both in Comparative Example 1 and Comparative Example 2.

What is claimed is:

1. An apparatus for detecting a decrease in a tire air pressure, comprising:
   a rotation velocity information detection means for periodically detecting tire rotation velocity information for the respective wheels of a vehicle;
   a frequency characteristic estimate means for estimating, based on the rotation velocity information obtained by the rotation velocity information detection means, a frequency characteristic of the rotation velocity information; and
   a judgment means for judging, based on the estimated frequency characteristic, a decrease in the air pressure of the tire,
   wherein the frequency characteristic estimate means includes, with regard to a time-series signal including the rotation velocity information,
   a parameter estimate means for performing a first step of subjecting parameters of a three-order or more linear model to a time-series estimate;
   an input signal estimate means for performing a second step of estimating, based on the estimated linear model and the rotation velocity information that is an output signal of the linear model, an input signal to the linear model;
   a parameter identification means for performing a third step of identifying, based on the estimated input signal and the rotation velocity information, parameters of a linear model caused to have a lower order of a second order; and
   a resonant frequency estimate means for performing a fourth step of estimating, based on the parameters identified based on the model caused to have a lower order of the second order, a resonant frequency of the tire in a torsional direction, and
   wherein the judgment means is configured to judge a tire having a decreased air pressure based on the estimated resonant frequency of the tire in the torsional direction.

2. An apparatus for detecting a decrease in a tire pressure, comprising:
   a rotation velocity information detection means for periodically detecting tire rotation velocity information for the respective wheels of a vehicle;
   a rotation acceleration information computation means for computing tire rotation acceleration information based on the rotation velocity information obtained from the rotation velocity information detection means;
   a frequency characteristic estimate means for estimating, based on the rotation acceleration information computed by the rotation acceleration information computation means, a frequency characteristic of the rotation acceleration information; and
   a judgment means for judging, based on the estimated frequency characteristic, a decrease in the air pressure of the tire,
   wherein the frequency characteristic estimate means includes, with regard to a time-series signal including the rotation acceleration information,
   a parameter estimate means for performing a first step of subjecting parameters of a three-order or more linear model to a time-series estimate;
   an input signal estimate means for performing a second step of estimating, based on the estimated linear model and the rotation acceleration information that is an output signal of the linear model, an input signal to the linear model;
   a parameter identification means for performing a third step of identifying, based on the estimated input signal and the rotation acceleration information, parameters of a linear model caused to have a lower order of a second order; and
   a resonant frequency estimate means for performing a fourth step of estimating, based on the parameters identified based on the model caused to have a lower order of the second order, a resonant frequency of the tire in a torsional direction, and
   wherein the judgment means is configured to judge a tire having a decreased air pressure based on the estimated resonant frequency of the tire in the torsional direction.

3. The apparatus for detecting a decrease in a tire air pressure according to any of claims 1 to 2,
   wherein the apparatus includes:
   a temperature sensor for detecting a temperature in the vicinity of the tire; and
   a correction means for correcting, based on the temperature information detected by the temperature sensor, the estimated resonant frequency of the tire in the torsional direction.

4. The apparatus for detecting a decrease in a tire air pressure according to any of claims 1 to 2,
   wherein the parameter estimate means is configured to use an iterative least squares technique to subject parameters of a three-order or more linear model to a time-series estimate.

5. The apparatus for detecting a decrease in a tire air pressure according to any of claims 1 to 2,
   wherein the parameter identification means is configured to subject, when identifying a second-order linear model, the input signal and output signal to a filtering process by a filter having a predetermined passband width.

6. The apparatus for detecting a decrease in a tire air pressure according to any of claims 1 to 2,
   wherein the parameter identification means is configured to identify a second-order linear model by an iterative least squares technique.

7. A method of detecting a decrease in a tire air pressure, comprising:
   a step of periodically detecting tire rotation velocity information for the respective wheels of a vehicle;
   a step of estimating, based on the rotation velocity information obtained in the rotation velocity information detection step, a frequency characteristic of the rotation velocity information; and
   a step of judging, based on the estimated frequency characteristic, a decrease in the air pressure of the tire,
   wherein the step of estimating the frequency characteristic includes, with regard to a time-series signal including the rotation velocity information, a first step of subjecting parameters of a three-order or more linear model to a time-series estimate;

a second step of estimating an input signal to the linear model based on the estimated linear model and the rotation velocity information that is an output signal of the linear model;

a third step of identifying, based on the estimated input signal and the rotation velocity information, parameters of a linear model caused to have a lower order of a second order; and a fourth step of estimating, based on the parameters identified based on the model caused to have a lower order of the second order, a resonant frequency of the tire in a torsional direction, and wherein the step of judging a decrease in the air pressure of the tire is configured to judge a tire having a decreased air pressure based on the estimated resonant frequency of the tire in the torsional direction.

8. A method of detecting a decrease in a tire air pressure, comprising:

a step of periodically detecting tire rotation velocity information for the respective wheels of a vehicle;

a step of computing tire rotation acceleration information based on the rotation velocity information obtained in the rotation velocity information detection step;

a step of estimating, based on the rotation acceleration information computed in the rotation acceleration information computation step, a frequency characteristic of the rotation acceleration information; and a step of judging, based on the estimated frequency characteristic, a decrease in the air pressure of the tire, wherein the step of estimating the frequency characteristic includes, with regard to a time-series signal including the rotation acceleration information:

a first step of subjecting parameters of a three-order or more linear model to a time-series estimate;

a second step of estimating an input signal to the linear model based on the estimated linear model and the rotation acceleration information that is an output signal of the linear model;

a third step of identifying, based on the estimated input signal and the rotation acceleration information, parameters of a linear model caused to have a lower order of a second order; and a fourth step of estimating, based on the parameters identified based on the model caused to have a lower order of the second order, a resonant frequency of the tire in a torsional direction, and wherein the step of judging a decrease in the air pressure of the tire is configured to judge, based on the estimated resonant frequency of the tire in the torsional direction, a tire having a decreased air pressure.

9. The method of detecting a decrease in a tire air pressure according to any of claims 7 to 8, wherein the method further includes a step of correcting, based on the temperature information from the temperature sensor for detecting a temperature in the vicinity of the tire, the estimated resonant frequency of the tire in the torsional direction.

10. The method of detecting a decrease in a tire air pressure according to any of claims 7 to 8, wherein the step of estimating parameters uses an iterative least squares technique to subject parameters of a three-order or more linear model to a time-series estimate.

11. The method of detecting a decrease in a tire air pressure according to any of claims 7 to 8, wherein the step of identifying parameters subjects, when identifying the second-order linear model, the input signal and output signal to a filtering process by a filter having a predetermined passband width.

12. The method of detecting a decrease in a tire air pressure according to any of claims 7 to 8, wherein the step of identifying parameters uses an iterative least squares technique to identify a second-order linear model.

13. A program for detecting a decrease in a tire air pressure for causing, in order to detect a decreased air pressure of a tire of a running vehicle based on a resonant frequency of the tire, a computer to function as a frequency characteristic estimate means for estimating, based on a rotation velocity information obtained by a rotation velocity information detection means for periodically detecting tire rotation velocity information for the respective wheels of a vehicle, a frequency characteristic of the rotation velocity information and a judgment means for judging, based on the estimated frequency characteristic, a decrease in the air pressure of the tire, wherein the frequency characteristic estimate means includes, with regard to a time-series signal including the rotation velocity information, a parameter estimate means for performing a first step of subjecting parameters of a three-order or more linear model to a time-series estimate;

an input signal estimate means for performing a second step of estimating, based on the estimated linear model and the rotation velocity information that is an output signal of the linear model, an input signal to the linear model;

a parameter identification means for performing a third step of identifying, based on the estimated input signal and the rotation velocity information, parameters of a linear model caused to have a lower order of a second order; and a resonant frequency estimate means for performing a fourth step of estimating, based on the parameters identified based on the model caused to have a lower order of the second order, a resonant frequency of the tire in a torsional direction, and wherein the judgment means is configured to judge a tire having a decreased air pressure based on the estimated resonant frequency of the tire in the torsional direction.

14. A program for detecting a decrease in a tire air pressure for causing, in order to detect a decreased air pressure of a tire of a running vehicle based on a resonant frequency of the tire, a computer to function as a rotation acceleration information computation means for computing tire rotation acceleration information based on rotation velocity information obtained by a rotation velocity information detection means for periodically detecting tire rotation velocity information for the respective wheels of a vehicle, a frequency characteristic estimate means for estimating, based on the rotation acceleration information computed by the rotation acceleration information computation means, a frequency characteristic of the rotation acceleration information, and a judgment means for judging, based on the estimated frequency characteristic, a decrease in the air pressure of the tire, wherein the frequency characteristic estimate means includes, with regard to a time-series signal including the rotation acceleration information, a parameter estimate means for performing a first step of subjecting parameters of a three-order or more linear model to a time-series estimate;

an input signal estimate means for performing a second step of estimating, based on the estimated linear model and the rotation acceleration information that is an output signal of the linear model, an input signal to the linear model;

a parameter identification means for performing a third step of identifying, based on the estimated input signal and the rotation acceleration information, parameters of a linear model caused to have a lower order of a second order; and a resonant frequency estimate means for performing a fourth step of estimating, based on the parameters identified based on the model caused to have a lower order of the second order, a resonant frequency of the tire in a torsional direction, and wherein the judgment means is configured to judge a tire having a decreased air pressure based on the estimated resonant frequency of the tire in the torsional direction.

* * * * *